US012601829B2

(12) United States Patent
Kim et al.

(10) Patent No.: US 12,601,829 B2
(45) Date of Patent: Apr. 14, 2026

(54) ELECTRONIC DEVICE FOR TRANSMITTING AND RECEIVING DATA UPON ULTRA WIDE BAND RANGING AND METHOD THEREOF

(71) Applicant: SAMSUNG ELECTRONICS CO., LTD., Suwon-si (KR)

(72) Inventors: Hyunchul Kim, Suwon-si (KR); Yi Yang, Suwon-si (KR); Moonseok Kang, Suwon-si (KR); Sungjun Lim, Suwon-si (KR); Kunyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 17/663,351

(22) Filed: May 13, 2022

(65) Prior Publication Data

US 2022/0350013 A1 Nov. 3, 2022

Related U.S. Application Data

(63) Continuation of application No. PCT/KR2022/005671, filed on Apr. 20, 2022.

(30) Foreign Application Priority Data

Apr. 28, 2021 (KR) ........................ 10-2021-0054953

(51) Int. Cl.
*G01S 13/76* (2006.01)
*G01S 11/02* (2010.01)
(Continued)

(52) U.S. Cl.
CPC ............. *G01S 13/765* (2013.01); *G01S 11/02* (2013.01); *G01S 13/0209* (2013.01); *G01S 13/08* (2013.01); *H04W 72/0446* (2013.01)

(58) Field of Classification Search
CPC ........ G01S 13/765; G01S 13/76; G01S 13/74; G01S 11/02; G01S 11/00; H04W 4/80; H04W 4/00
See application file for complete search history.

(56) References Cited

U.S. PATENT DOCUMENTS 8,589,359 B2 * 11/2013 Gurney ............... G06F 16/2453
707/670
10,942,250 B2 3/2021 Bartov et al.
(Continued)

FOREIGN PATENT DOCUMENTS

KR 20210043642 A 4/2021
WO 2017196583 A2 11/2017
WO 2019008150 A1 1/2019

OTHER PUBLICATIONS

International Search Report and Written Opinion of the International Searching Authority dated Jul. 27, 2022, in connection with International Application No. PCT/KR2022/005671, 9 pages.
(Continued)

*Primary Examiner* — Diana J. Cheng

(57) ABSTRACT

An electronic device according to various embodiments of the present disclosure may include a wireless communication circuit, a memory, and a processor operatively connected to the memory and the wireless communication circuit, wherein the memory stores instructions that when executed cause the processor to start a ranging round by transmitting, to an external electronic device, a ranging control message (RCM) including transmission control information of data to be transmitted, to perform ranging based on the ranging control message, and upon completion of ranging, to transmit, based on the transmission control information included in the ranging control message, the data in a slot allocated in the ranging round.

20 Claims, 8 Drawing Sheets

(51) Int. Cl.
  *G01S 13/02*      (2006.01)
  *G01S 13/08*      (2006.01)
  *H04W 72/0446*   (2023.01)

(56)                References Cited

U.S. PATENT DOCUMENTS

| | | |
|---|---|---|
| 11,546,013 B2 | 1/2023 | Lee et al. |
| 2020/0106877 A1 | 4/2020 | Ledvina et al. |
| 2020/0284897 A1 | 9/2020 | Padaki et al. |
| 2020/0355819 A1 | 11/2020 | Padaki et al. |
| 2020/0382158 A1 | 12/2020 | Yang et al. |
| 2021/0112548 A1 | 4/2021 | Perthuis et al. |

OTHER PUBLICATIONS

Supplementary European Search Report dated Jun. 12, 2024, in connection with European Patent Application No. 22796038.2, 11 pages.
IEEE Standards Association, "IEEE Standard for Low-Rate Wireless Networks, Amendment 1: Enhanced Ultra Wideband (UWB) Physical Layers (PHVs} and Associated Ranging Techniques," Sep. 2020, 174 pages.
Office Action issued Jan. 7, 2026, in connection with Korean Patent Application No. 10-2021-0054953, 7 pages.

\* cited by examiner

ELECTRONIC DEVICE FOR TRANSMITTING AND RECEIVING DATA UPON ULTRA WIDE BAND RANGING AND METHOD THEREOF

CROSS-REFERENCE TO RELATED APPLICATIONS

This application is a continuation of International Application No. PCT/KR2022/005671, filed Apr. 20, 2022, which is based on and claims priority under 35 U.S.C. § 119 to Korean Patent Application No. 10-2021-0054953, filed Apr. 28, 2021, in the Korean Intellectual Property Office, the disclosures of which are incorporated by reference herein in their entirety

BACKGROUND

1. Field

Various embodiments of the present disclosure relate to an electronic device for transmitting or receiving data upon ultra-wideband ranging (UWB) ranging, and a method thereof.

2. Description of Related Art

With the development of digital technologies, various types of electronic devices have been widely utilized, such as, mobile communication terminals, personal digital assistants (PDA), electronic organizers, smartphones, tablet personal computers (PC), wearable devices, or the like. Hardware parts and/or software parts of an electronic device have been continuously improved in order to support and increase the functions of the electronic device.

Recently, as the wireless communication system has been developed, an electronic device is capable of using ranging technology that performs communication with an external electronic device using a short-range wireless communication scheme, such as UWB communication, and measures a location (or a distance). UWB is wireless communication technology that is capable of using a significantly wide frequency band greater than or equal to several GHz in a baseband without using wireless carrier waves.

SUMMARY

In the case in which an electronic device performs ranging with at least one electronic device using a UWB communication scheme, if the electronic device needs to transmit data to a counterpart electronic device that performs ranging, data may be transmitted or received according to another wireless communication scheme such as Bluetooth or the like, and thus, data transmission may be delayed, which is a drawback.

According to various embodiments of the present disclosure, there is provided an electronic device that performs, using a UWB communication scheme, data transmission or reception with a counterpart electronic device that performs ranging, when performing UWB ranging.

The technical subject matter of the present disclosure is not limited to the above-mentioned technical subject matter, and other technical subject matters which are not mentioned may be clearly understood by those skilled in the art based on the following description.

An electronic device according to various embodiments of the present disclosure may include a wireless communication circuit, a memory, and a processor operatively connected to the memory and the wireless communication circuit, and the memory stores instructions that when executed cause the processor to start a ranging round by transmitting, to an external electronic device, a ranging control message (RCM) including transmission control information of data to be transmitted, to perform ranging based on the ranging control message, and upon completion of ranging, to transmit, based on the transmission control information included in the ranging control message, the data in a slot allocated in the ranging round.

A method of an electronic device according to various embodiments of the present disclosure may include an operation of starting a ranging round by transmitting, to an external electronic device, an RCM including transmission control information of data to be transmitted, an operation of performing ranging based on the ranging control message, and operation of transmitting, based on the transmission control information included in the ranging control message, the data in a slot allocated in the ranging round, upon completion of ranging.

According to various embodiments of the present disclosure, via a UWB ranging round, an electronic device can transmit data in real time to a counterpart electronic device that performs ranging.

According to various embodiments of the present disclosure, via a UWB ranging round, an electronic device can promptly transmit data that needs to be transmitted to a counterpart electronic device that performs ranging.

According to various embodiments of the present disclosure, via a UWB ranging round, an electronic device can segment and transmit data when needed, thereby increasing a successful transmission rate.

According to various embodiments of the present disclosure, when data transmission via a UWB ranging round fails, an electronic device retransmits the corresponding data, thereby increasing a successful transmission rate.

In addition, various effects directly or indirectly recognized from the disclosure can be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Regarding the descriptions of drawings, identical or like reference numerals in the drawings denote identical or like elements.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
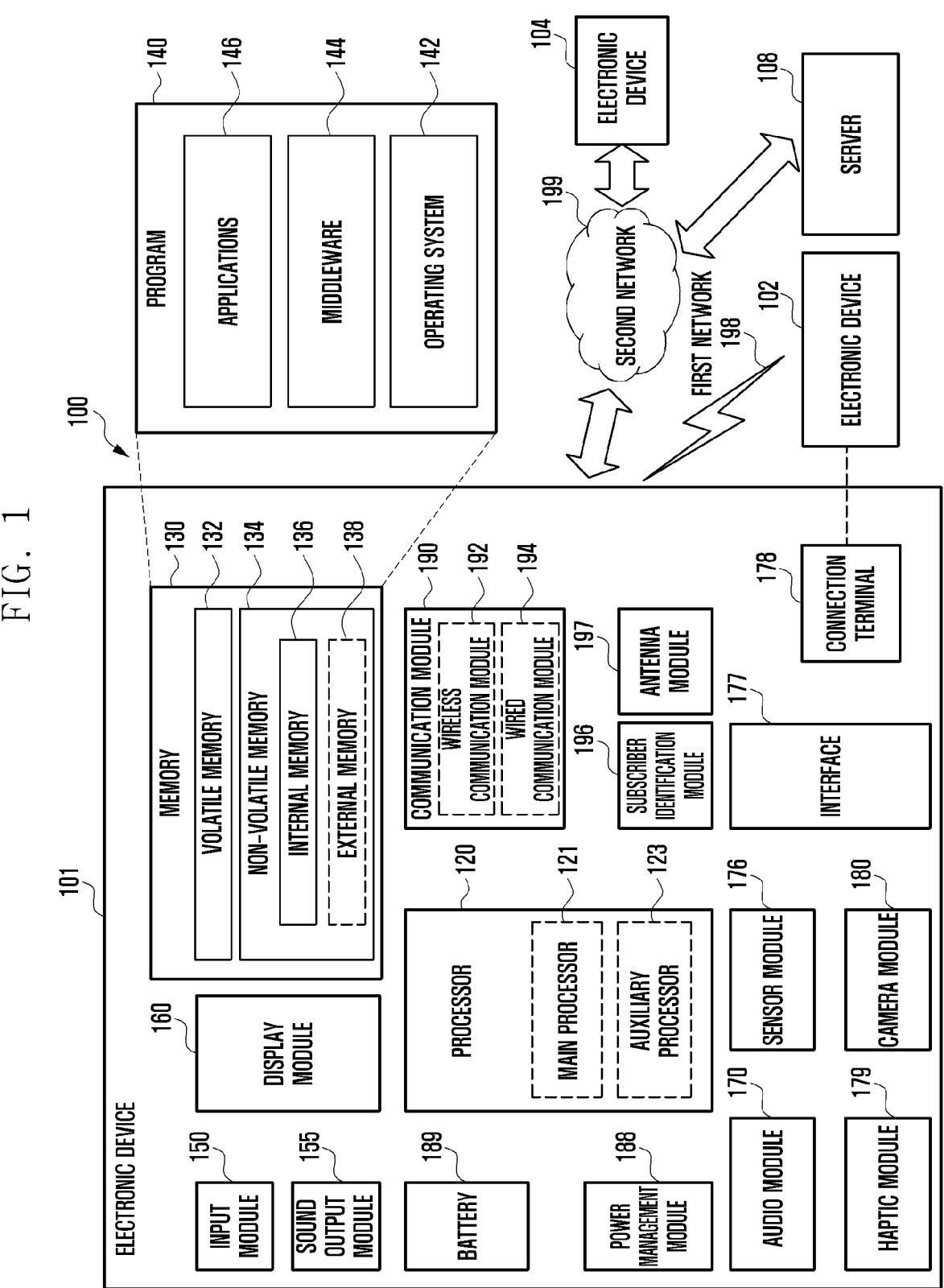
FIG. 1 is a block diagram illustrating an electronic device in a network environment according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
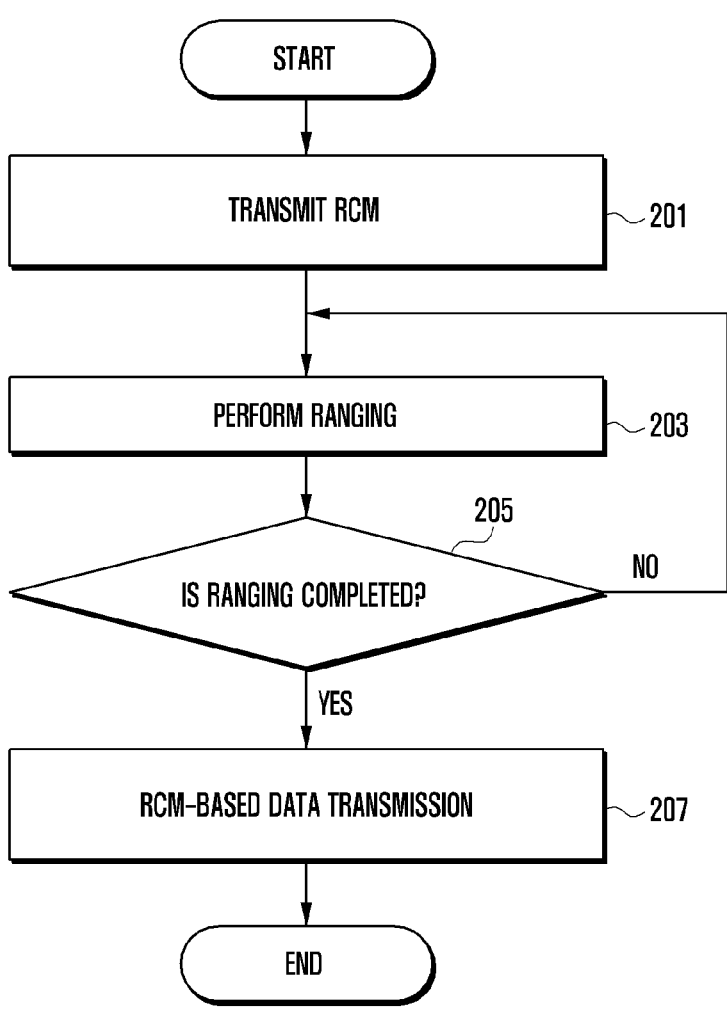
FIG. 2 is a diagram illustrating an operation of performing, by an electronic device, UWB ranging with another electronic device according to various embodiments of the present disclosure.

FIG. 2 is a diagram illustrating an operation in which an electronic device (e.g., the electronic device 101 of FIG. 1) performs UWB ranging with another electronic device (e.g., the electronic device 102 of FIG. 1), and, upon completion of UWB ranging, transmits data. According to various embodiments of the present disclosure, the first electronic device 101 may include some or all of the elements of the electronic device 101 of FIG. 1. According to various embodiments of the present disclosure, the second electronic device 102 may include some or all of the elements of the electronic device 101 of FIG. 1. Hereinafter, the electronic device 101 may be referred to as the first electronic device 101, and the electronic device 102 may be referred to as a second electronic device.

According to various embodiments of the present disclosure, in operation 201, the first electronic device 101 may start a ranging round by transmitting, to the second electronic device 102, a ranging control message (RCM) including transmission control information of data desired to be transmitted. According to an embodiment of the present disclosure, the first electronic device 101 may transmit or receive the frame of each slot of the ranging round as an initiator or a responder of each slot of the ranging round. The second electronic device 102 is a counterpart device and may transmit or receive the frame of each slot as a responder or an initiator.

According to an embodiment of the present disclosure, the ranging control message may include information associated with a round interval of a subsequent ranging round. The round interval of the subsequent ranging round may be the start time of the subsequent ranging round. In addition, the ranging control message may include information associated with when and who is to transmit which ranging frame (e.g., a poll frame or a reply frame) in a subsequent ranging round.

According to an embodiment of the present disclosure, the ranging control message may include information for controlling transmission of data desired to be transmitted, upon completion of ranging, in a subsequent ranging round. For example, the ranging control message may include information associated with the round interval of a subsequent ranging round, the start time of a ranging round, slot allocation, the time of each slot, and/or information associated with frame transmission. According to an embodiment of the present disclosure, the ranging control message may include a ranging device management list, and the ranging device management list may include the definition of a frame transmitted or received via each slot in a subsequent ranging round, and may include various types of transmission control information needed for configuring and transmitting each frame. The transmission control information for controlling transmission of data may be included as, for example, an additional element in addition to the existing elements of a ranging device management list.

According to various embodiments of the present disclosure, the first electronic device 101 may perform ranging based on information included in the ranging control message in operation 203.

According to an embodiment of the present disclosure, the first electronic device 101 and the second electronic device 102 may perform ranging in units of ranging rounds. A ranging round may be a period spent until a single intact range measurement cycle is completed between a pair of ranging devices that join ranging exchange. Each ranging round may include a plurality of ranging slots. Each ranging slot may be a period for transmission of a single ranging frame.

According to various embodiments of the present disclosure, the first electronic device 101 and the second electronic device 102 may perform ranging in various ways. For example, according to an embodiment of the disclosure, the first electronic device 101 may perform a single-sided two-way-ranging (SS-TWR) or a double-sided two-way ranging (DS-TWR). The SS-TWR is a method of performing ranging by measuring a round-trip delay of a transmitted single message and a received reply between the first electronic device 101 and the second electronic device 102. The DS-TWR is an extension of the SS-TWR, and is a method of obtaining a time-of-flight (TOF) result by measuring a round-trip time twice and combining the two round-trip times.

According to various embodiments of the present disclosure, the first electronic device 101 determines whether the ranging is successfully completed in operation 205, and if the ranging is completed, the first electronic device 101 may transmit, based on the transmission control information included in the ranging control message, data desired to be transmitted in a slot separately allocated in the ranging round in operation 207.

Figure 3:
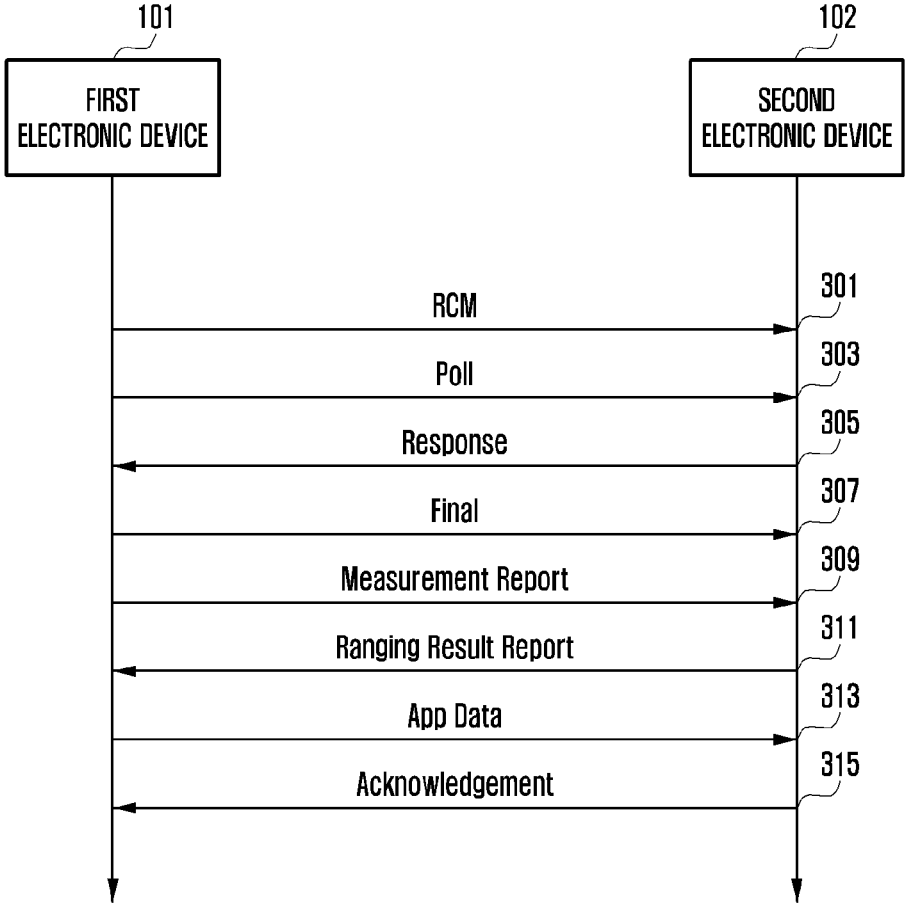
FIG. 3 is a diagram illustrating an example of an operation of transmitting, by an electronic device, data to another electronic device via a UWB ranging round according to various embodiments of the present disclosure.

FIG. 3 is a diagram illustrating an operation in which an electronic device (e.g., the electronic device 101 of FIG. 2) performs UWB ranging with another electronic device (e.g., the electronic device 102 of FIG. 2).

According to various embodiments of the present disclosure, the first electronic device 101 may control ranging by transmitting an RCM in operation 301.

According to an embodiment of the present disclosure, after ranging is completed, data may be transmitted by transmitting an additional frame. According to an embodiment, data to be transmitted may include, for example, various types of data such as information related to a change of a parameter after ranging begins, authentication information for an access service, and/or control information associated with execution of a predetermined event.

According to various embodiments of the present disclosure, when data transmission is expected, slots, the number of which is greater than the number of slots needed for normal ranging, may be allocated. Accordingly, the length of a ranging round may need to be determined. According to an embodiment of the present disclosure, before a ranging round begins, the length of the ranging round may be determined via communication based on another communication scheme, for example, Bluetooth. For example, in the case of a normal one-to-one DS-TWR, although 6 slots are needed to obtain distance information for both of the first electronic device 101 and the second electronic device 102, additional slots, for example, 8 or 10 slots, may be allocated to secure a slot for data transmission. Hereinafter, an example in which a ranging round length of 10 is used will be described.

According to various embodiments of the present disclosure, information associated with each slot of a ranging round, for example, information such as a subject that transmits data in each slot and the type of data transmitted, may be defined based on a value of a ranging device management list included in an RCM transmitted to the second electronic device 102 in a first slot of the ranging round.

Table 1 below is an example of the ranging device management list according to an embodiment of the present disclosure.

TABLE 1

| ranging device management list | | | | | | |
|---|---|---|---|---|---|---|
| 1 | 2 | 3 | 4 | 5 | 6 | 7 |
| 03000000 | 04020002 | 07000004 | 09000004 | 0A02000A | 0D000010 | 0E020010 |

According to various embodiments of the present disclosure, the ranging control message may include various types of control information for controlling a ranging round. According to various embodiments of the present disclosure, the ranging control message may include transmission control information for controlling transmission of data desired to be transmitted, upon completion of successful ranging, in a subsequent ranging round. For example, the ranging control message may include information associated with the round interval of a subsequent ranging round, the start time of a ranging round, slot allocation, the time of each slot, and/or information associated with who is to transmit which ranging frame (e.g., a poll frame or a reply frame). According to an embodiment of the present disclosure, the ranging control message may include a ranging device management list. The ranging device management list may further include information associated with a data transmission frame and/or acknowledgement (Ack) frame transmitted or received in an additional slot after ranging is successfully completed, in addition to information associated with a poll frame, a reply frame, a final frame, and report frames transmitted or received in each slot of a ranging round.

Referring to Table 1, the ranging device management list according to various embodiments of the present disclosure may include information associated with a frame transmitted or received in each slot allocated to a subsequent ranging round. In Table 1, the ranging device management list may include 7 elements. In Table 1, element #1 to element #5 may correspond to a poll frame, a reply frame, a final frame, a measurement report frame, and a ranging result report frame, respectively, and element #6 may correspond to a data transmission frame and element #7 corresponds to an acknowledgement frame.

Table 2 below is an example of the structure of each of the elements in the normal ranging device management list of Table 1.

TABLE 2

| Ranging Role | Ranging Slot Index | Address | Scheduled UWB Message | Stop Ranging | Reserved |
|---|---|---|---|---|---|
| Bits: 1 | 8 | 16 | 4 | 1 | 2 |

The structure of a poll frame, a reply frame, a final frame, a management report frame, and a ranging result report frame which respectively correspond to element #1 to element #5 in the ranging device management list of Table 1 according to various embodiments of the present disclosure are as shown in Table 2. Referring to Table 2, a ranging role field indicates whether the first electronic device 101 performs a role of transmitting a frame as an initiator or performs a role of receiving a frame as a responder in each frame element. A ranging slot index field indicates what number-th slot is to be used by each element for transmitting or receiving a frame in a subsequent ranging round. An address field indicates the address of a device that transmits a frame in a slot corresponding to each element. A scheduled UWB message field may include an ID indicating the type of a message transmitted in each element, for example, one of a poll, a reply, a final, a measurement report, and a ranging result report. A stop ranging field may be displayed when a ranging operation does not need to be performed for various reasons. A reserved field may be an undefined field so that the field is capable of being used by separately defining the field.

According to various embodiments of the present disclosure, a data transmission frame element and an acknowledgement frame element corresponding to element #6 and element #7 in Table 1 among the elements in the ranging device management list may be elements defined for data transmission. Table 3 below is an example of the structure of a data transmission frame element and an acknowledgement frame element that correspond to, for example, element #6 and element #7 defined for data transmission in the ranging device management list according to various embodiments of the present disclosure.

frame. According to various embodiments of the present disclosure, in operation 307, the first electronic device 101 may transmit, to the second electronic device 102, a final frame that responds to the acknowledgement frame in operation 307.

According to various embodiments of the present disclosure, in operation 309, the first electronic device 101 may transmit, to the second electronic device 102, a measurement report including a round trip time and/or a reply time obtained based on time information (timestamp) of a transmission point in operation 303 and operation 307 and/or time information (timestamp) of a reception point in operation 305. For example, the first electronic device 101 may calculate a round trip time using the difference between the time information of the transmission point of operation 303 and the time information of the reception point of operation 305. For example, the first electronic device may calculate a replay time using the time information of the reception point of operation 305 and the time information of the transmission point of operation 307.

According to various embodiments of the present disclosure, in operation 311, the first electronic device 101 may receive, from the second electronic device 102, a ranging result report including a distance value finally obtained. For example, the second electronic device 102 may obtain the round trip time and/or reply time in operations 303, 305, and 307, in addition to the round trip time and/or reply time included in the measurement report received in operation 309, may obtain a time of flight (TOF) using the four pieces of time information, and may include the TOF in a ranging result report and may transmit the same to the first electronic device 101.

TABLE 3

| | Ranging Role | Ranging Slot Index | Address | Scheduled UWB Message | Stop Ranging | Time-Critical Message | Reserved |
|---|---|---|---|---|---|---|---|
| 0 × 0D000010 | 1 | 00000110b | 0 × 0000 | 1000b | 0 | 0 | 0 |
| 0 × 0E020010 | 0 | 00000111b | 0 × 0001 | 1000b | 0 | 0 | 0 |

In Table 3, a time-critical message field indicates the importance of corresponding data, and if the data is indicated as important data, the data may be retransmitted a predetermined number of times if the data transmission thereof fails. Data retransmission will be described in detail. The structure of a data transmission frame element and an acknowledgement frame element in a ranging device management list according to various embodiments of the present disclosure may use 1 bit of a reserved field as a time-critical message field in the structure of the elements of the normal ranging device management list shown in Table 2. In addition, the structure from a ranging role field to a stop ranging field in the structure of a data transmission frame element and an acknowledgement frame element may be the same as the structure of elements of the normal ranging device list as shown in Table 2.

According to various embodiments of the present disclosure, the first electronic device 101 may transmit, as an initiator, a poll frame to the second electronic device 102 in operation 303, and the first electronic device 101 may receive a reply frame from the second electronic device 102 in operation 305. The first electronic device 101 and/or the second electronic device 102 may perform ranging based on a propagation time of a poll frame and an acknowledgement According to an embodiment of the present disclosure, based on the ranging device management list included in the RCM received in operation 301 in the corresponding ranging round, the second electronic device 102 that recognizes that data transmission is planned in the corresponding ranging round may transmit the reception sensitivity of frames received in the current ranging round, together with the ranging result report in operation 311.

According to various embodiments of the present disclosure, after successfully performing ranging, the first electronic device 101 may transmit data via a separate frame, for example, a data transmission frame, in operation 313, and may receive, from the second electronic device 102 via a reply frame, an acknowledgement (Ack) message indicating whether data is received in operation 315, based on the information of the RCM transmitted to the second electronic device 102 in operation 301, for example, based on information associated with a data transmission frame element and an acknowledgement frame element in the ranging management list described in Table 3.

Table 4 below is an example of the structure of a data transmission frame message that is based on information associated with the data transmission frame element of Table 3 according to various embodiments of the present disclosure. According to an embodiment, after ranging is success-fully completed, within a corresponding ranging round, data desired to be transmitted in a data transmission frame may be transmitted by being included in a message having a structure shown in Table 4. For example, the data desired to be transmitted may be included in an app data field of a message and may be transmitted.

TABLE 4

| Vendor OUI | Msg ID | Reserved | Msg Control | App Data |
|---|---|---|---|---|
| Octets: 3 byte | Bits: 4 | 4 | 8 | Variable |
| 5A18FF | 8 | 0 | b0—Acknowledgement b1—Segmented Frame b2~b7—Reserved | |

Message fields in Table 4 may be included in, for example, a PSDU, and may be transmitted to the second electronic device 102. Referring to Table 4, 0x5A18FF that is the value of vendor organizationally unique identifier (OUI) may be a company ID (CID) that IEEE allocates to FiRa consortium, and an Msg ID field may include a message identifier. b0 of the message control field may indicate whether to receive an acknowledgement (Ack) frame indicating whether data is successfully received. b1 may be used for indicating whether data is to be segmented for transmission, that is, whether an additional data to be transmitted is present. For example, if it is desired to receive an Ack message that indicates whether data is successfully received, b0 may be used to indicate the same. For example, if data to be additionally transmitted is present, the fact that an additional data is to be transmitted in a subsequent slot may be indicated using b1. According to various embodi-ments of the present disclosure, in operation 313, the first electronic device 101 may transmit a message including data to the second electronic device 102 based on information obtained via ranging. For example, the message including the data may include the structure of a data transmission frame which has described with reference to Table 4.

According to an embodiment of the present disclosure, operation 313 may be performed when ranging is success-fully completed by receiving the ranging result report including the distance value finally calculated in operation 311.

According to an embodiment of the present disclosure, even though data to be transmitted is present, if ranging fails, it is determined that transmission or reception is difficult due to various reasons, and data transmission may not be per-formed in a corresponding ranging round. In this instance, even when a slot for data transmission is allocated by a ranging device management list, the first electronic device 101 may not transmit data, and the second electronic device 102 may not await reception. In this instance, data that is not transmitted may be transmitted, upon completion of suc-cessful ranging, in a subsequent ranging round.

According to various embodiments of the present disclo-sure, in operation 315, the first electronic device 101 may receive, from the second electronic device 102, an Ack message indicating whether the message transmitted in operation 313 is successfully received. For example, whether the second electronic device 102 is to transmit an acknowledgement indicating whether a message including data is successfully received may be controlled based on the information of the message control field of Table 4, particu-larly, b0.

According to another embodiment, a slot for data trans-mission may be additionally allocated during a ranging round, and data transmission may be performed. For example, in the situation in which the movement of the first electronic device 101 and/or the second electronic device 102 stops or slows down, if a ranging period is increased or the execution of a ranging operation is not needed, a slot for data transmission may be allocated and data may be trans-mitted.

Figure 4:
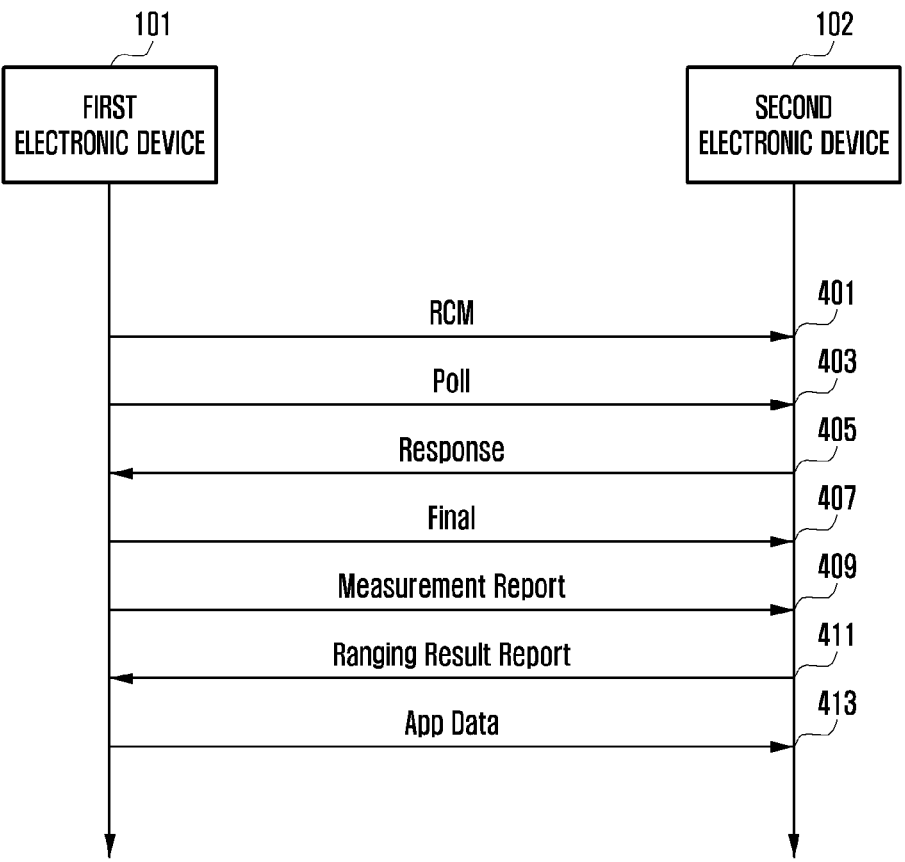
FIG. 4 is a diagram illustrating another example of an operation of transmitting, by an electronic device, data to another electronic device via a UWB ranging round according to various embodiments of the present disclosure.

FIG. 4 is a diagram illustrating another example of an operation in which an electronic device (e.g., the electronic device 101 of FIG. 2) transmits data to another electronic device (e.g., the electronic device 102 of FIG. 2) via a UWB ranging round.

According to various embodiments of the present disclo-sure, the first electronic device 101 may control ranging by transmitting an RCM in operation 401.

According to various embodiments of the present disclo-sure, the ranging control message may include various types of control information for controlling a ranging round. According to various embodiments of the present disclosure, the ranging control message may include transmission con-trol information for controlling transmission of data desired to be transmitted, upon completion of successful ranging, in a subsequent ranging round. For example, the ranging control message may include information associated with a round interval of a subsequent ranging round, the start time of a ranging round, slot allocation, the time of each slot, and/or information associated with who is to transmit which ranging frame (e.g., a poll frame or a reply frame).

According to an embodiment of the present disclosure, the ranging control message may include a ranging device management list. The ranging device management list may further include information associated with a data transmis-sion frame transmitted or received in an additional slot after ranging is successfully completed, in addition to information associated with a poll frame, a reply frame, a final frame, and report frames transmitted or received in each slot of a ranging round. The information associated with a frame transmitted or received in each slot of the ranging round may include information such as a subject that transmits data in each slot or the type of data transmitted.

According to an embodiment of the present disclosure, if the first electronic device 101 does not need an Ack asso-ciated with an additional data transmission frame, the defi-nition of an information frame associated with an acknowl-edgement in the ranging device management list may be omitted as shown in Table 5 described below.

According to an embodiment of the present disclosure, as described with reference to FIG. 3, after a ranging operation is completed, an additional frame may be transmitted based on the ranging management list and data may be transmitted. According to an embodiment of the present disclosure, the data to be transmitted may include, for example, various types of data such as information related to a change of a parameter after ranging begins, authentication information for an access service, and/or control information associated with execution of a predetermined event.

Table 5 below is an example of the ranging device management list according to an embodiment.

TABLE 5

| ranging device management list | | | | | |
|---|---|---|---|---|---|
| 1 | 2 | 3 | 4 | 5 | 6 |
| 03000000 | 04020002 | 07000004 | 09000004 | 0A02000A | 0D000010 |

With reference to Table 5 according to an embodiment, element #7 corresponding to an Ack frame may be omitted when compared to Table 1 described above. Accordingly, after data is transmitted to the second electronic device 102 in a slot defined by element #6 upon completion of ranging, the second electronic device 102 may omit transmission of an acknowledgement to the first electronic device 101.

According to various embodiments of the present disclosure, after transmission of an RCM as described above, based at least on various pieces of control information included in the RCM, transmission of a poll frame in operation 403, reception of a reply frame in operation 405, transmission of a final frame in operation 407, and reception of a ranging result report frame in operation 411 may be performed. The operations may be similar to the description which has been provided with reference to FIG. 3 and thus, the detailed description thereof will be omitted.

According to an embodiment of the present disclosure, after ranging is successfully performed, the first electronic device 101 may transmit data in a separate frame, based on control information of the RCM, for example, element #6 in the ranging management list, in operation 413.

According to an embodiment of the present disclosure, the first electronic device 101 does not define an Ack frame associated with whether the data transmitted in operation 413 is received in the RCM. Accordingly, even when the second electronic device 102 receives or does not receive the data transmitted in operation 413, an operation corresponding to operation 315 of FIG. 3 may be omitted and the second electronic device 102 may not transmit an Ack.

Figure 5:
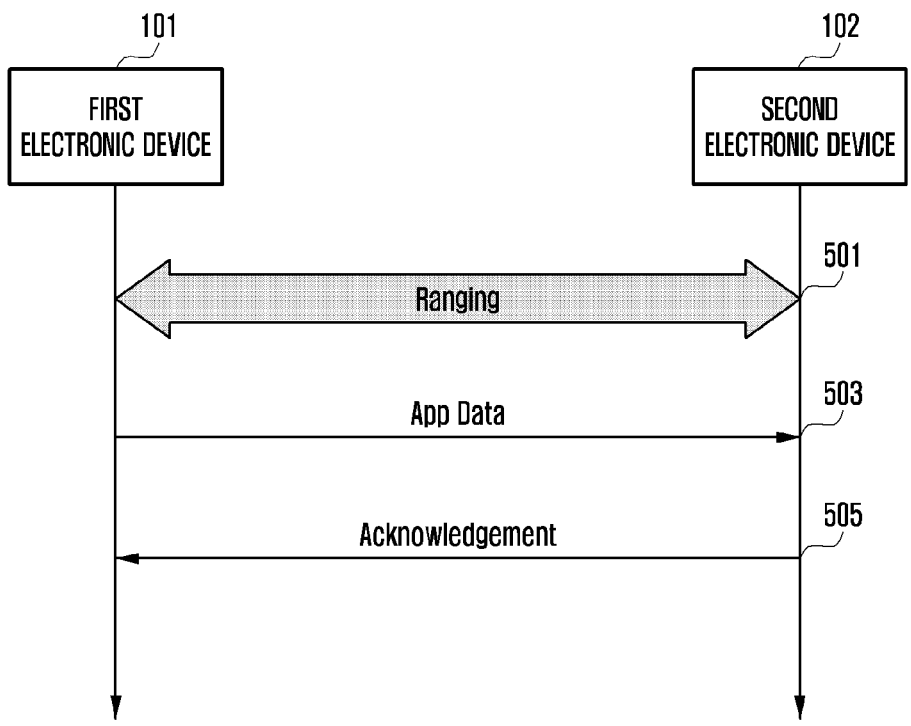
FIG. 5 is a diagram illustrating an example of an operation of indicating and transmitting, by an electronic device, important data to another electronic device via a UWB ranging round according to various embodiments of the present disclosure.

FIG. 5 is a diagram illustrating an example of an operation in which an electronic device (e.g., the electronic device 101 of FIG. 2) transmits data to another electronic device (e.g., the electronic device 102 of FIG. 2) via a UWB ranging round.

According to various embodiments of the present disclosure, in operation 501, the first electronic device 101 may transmit an RCM so as to control ranging, and may perform ranging by performing transmission of a poll frame, reception of a reply frame, transmission of a final frame, and reception of a ranging result report frame based at least on various types of control information included in the RCM. For example, operation 501 may correspond to operations 301 to 311 of FIG. 3. The operations may be similar to the description which has been provided with reference to FIG. 3 and thus, the detailed description thereof will be omitted.

According to an embodiment of the present disclosure, in the RCM transmitted in operation 501, the first electronic device 101 may set the value of a time critical message field as shown in Table 3 to 1 depending on the importance of data desired to be transmitted in a data transmission frame in the structure of the data transmission frame elements of a ranging device management list, and may retransmit an important message when transmission thereof fails.

According to an embodiment of the present disclosure, after ranging is successfully performed, the first electronic device 101 may transmit data in a separate frame, based on element #6 of the ranging management list among control information of the RCM in operation 503.

According to an embodiment of the present disclosure, the first electronic device 101 performs an operation of awaiting reception of an acknowledgement message associated with the data transmission, and may receive an acknowledgement message transmitted from the second electronic device 102 in operation 505.

According to an embodiment of the present disclosure, when the first electronic device 101 receives, from the second electronic device 102, an acknowledgement message that acknowledges reception of the data in operation 505, the first electronic device 101 may recognize that data transmission is completed. Accordingly, the first electronic device 101 may terminate a round without additional frame transmission or reception in the corresponding ranging round.

According to another embodiment of the present disclosure, if an acknowledgement message is not received or an acknowledgement message indicating reception failure is received in a slot allocated for awaiting reception in operation 505, the first electronic device 101 may determine whether to retransmit data of which transmission fails, based on the value of a time-critical message field defined in element #6 of the ranging device management list of the RCM as shown in Table 3. For example, if the value of the time-critical message field is set to 1, the first electronic device 101 may retransmit the data of which transmission fails in a subsequent slot. In addition, if retransmission of the data of which transmission fails is not allowed in a subsequent slot, for example, if, in consideration of the length of a ranging round, no other allocated slot is present or a ranging round ends, the first electronic device 101 may retransmit the corresponding data in a subsequent ranging round.

According to an embodiment of the present disclosure, based on the setting of the value of the time-critical message field, the first electronic device 101 may or may not retransmit the data transmitted in operation 503 in the current ranging round.

According to an embodiment of the present disclosure, the first electronic device 101 may identify that the value of the time-critical message field indicates an unimportant message, and thus, may not retransmit the data of which transmission fails and terminate the ranging round. For example, if, in the RCM transmitted in operation 501, the value of the time-critical message field as shown in Table 3 of the ranging device management list is set to, for example, 0 that indicates an unimportant message, even when an acknowledgement message is not received or an acknowledgement message indicating reception failure is received in a slot allocated for awaiting reception in operation 505, in association with the data transmitted in operation 503, the first electronic device 101 may not retransmit the corresponding data.

According to another embodiment of the present disclosure, the first electronic device 101 may identify that the value of the time-critical message field indicates an important message, and thus, may retransmit the data of which transmission fails.

Figure 6:
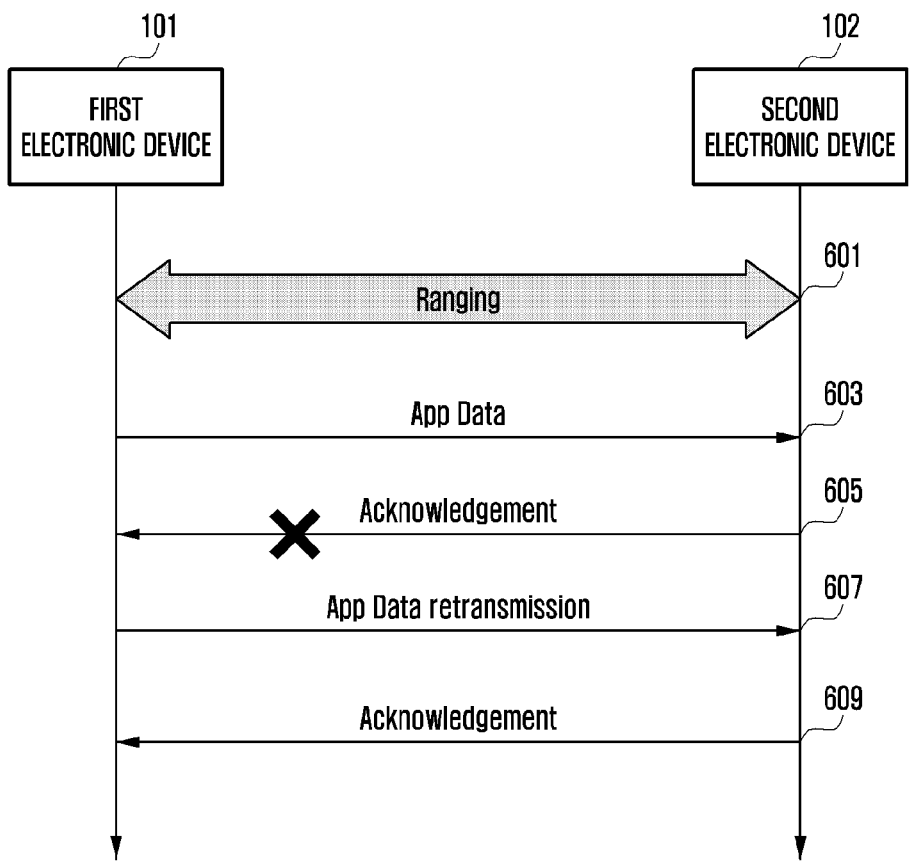
FIG. 6 is a diagram illustrating an example of an operation of retransmitting, by an electronic device, important data to another electronic device via a UWB ranging round according to various embodiments of the present disclosure.

FIG. 6 is a diagram illustrating an example of an operation in which an electronic device (e.g., the electronic device 101 of FIG. 2) retransmits data to another electronic device (e.g., the electronic device 102 of FIG. 2) via a UWB ranging round, when data transmission fails.

According to various embodiments of the present disclosure, in operation 601, the first electronic device 101 may transmit an RCM so as to control ranging, and may perform ranging by performing transmission of a poll frame, reception of a reply frame, transmission of a final frame, and reception of a ranging result report frame based at least on various types of control information included in the RCM. For example, operation 601 may correspond to operations 301 to 311 of FIG. 3. The operations may be similar to the description which has been provided with reference to FIG. 3 and thus, the detailed description thereof will be omitted.

According to an embodiment of the present disclosure, in the RCM transmitted in operation 601, the first electronic device 101 may set the value of a time-critical message field as shown in Table 3 to, for example, 1 that is a bit indicating an important message, if data desired to be transmitted in a data transmission frame has a high importance in the structure of the data transmission frame elements of a ranging device management list, and may perform retransmission when transmission fails, since it is an important message.

According to an embodiment of the present disclosure, after ranging is successfully performed, the first electronic device 101 may transmit data in a separate frame, based on element #6 of the ranging management list among control information of the RCM in operation 603.

According to an embodiment of the present disclosure, the first electronic device 101 may perform an operation of awaiting reception of an acknowledgement message associated with the data transmission, and may receive an acknowledgement message indicating data reception failure from the second electronic device 102 or may fail to receive an acknowledgement message in the corresponding slot, in operation 605.

According to an embodiment of the present disclosure, if an acknowledgement message is not received or an acknowledgement message indicating reception failure is received in the slot allocated for awaiting reception of an acknowledgement in operation 605, the first electronic device 101 may identify that the value of a time-critical message field defined in element #6 of the ranging device management list of the RCM indicates an important message, and thus, may retransmit the data of which transmission fails in operation 607.

According to an embodiment of the present disclosure, the first electronic device 101 may terminate the corresponding ranging round when an acknowledgement message indicating successful reception is received in the slot allocated for awaiting the reception of an acknowledgement in operation 609.

According to an embodiment of the present disclosure, if an acknowledgement message is not received or an acknowledgement message indicating reception failure is received in the slot allocated for awaiting reception of an acknowledgement, the first electronic device 101 may retransmit the data a predetermined number of times in slots remaining in the corresponding ranging round, for example, 7 slots remaining after excluding 7 slots for reception of an Ack from 14 slots remaining at the point in time at which ranging is completed if the length of the ranging round is 20, until an acknowledgement message indicating successful reception is received. In this instance, in the case of reception failure or after transmitting an acknowledgement message indicating reception failure, the second electronic device 102 may await reception in a subsequent slot. For example, in the case of reception failure, the second electronic device 102 may await reception of data a predetermined number of times until the corresponding ranging round ends.

According to an embodiment of the present disclosure, when retransmission is not successfully performed in the corresponding ranging round, the first electronic device 101 may retransmit the corresponding data in a subsequent ranging round.

Figure 7:
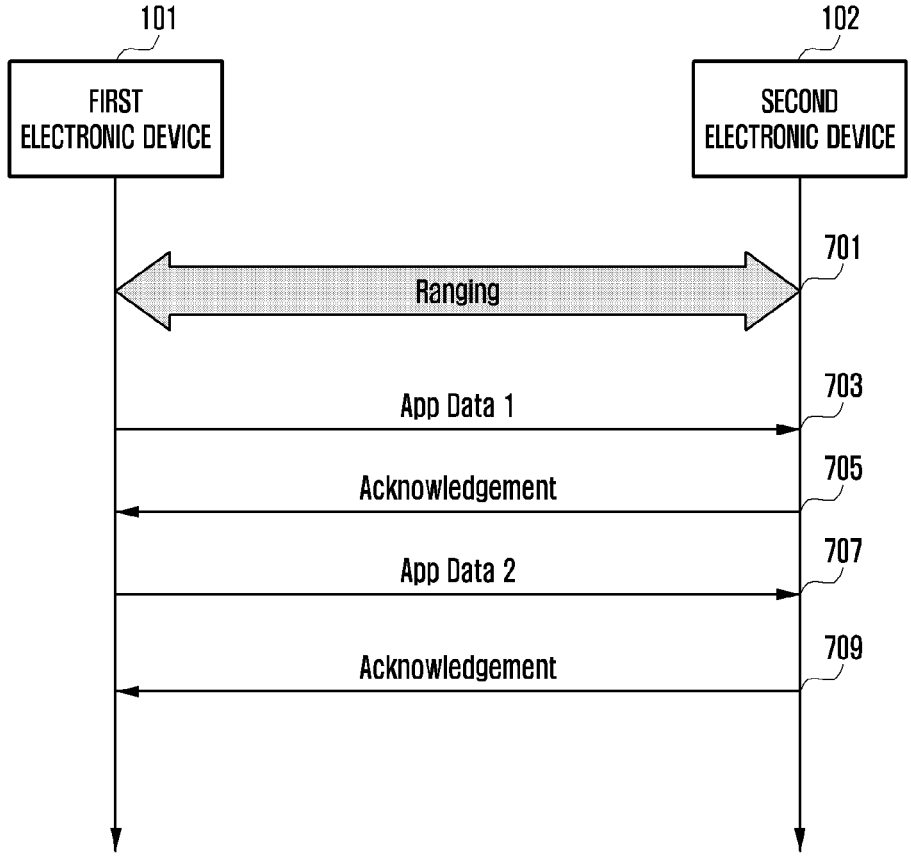
FIG. 7 is a diagram illustrating an example of an operation of segmenting and transmitting, by an electronic device, data to another electronic device via a UWB ranging round according to various embodiments of the present disclosure.

FIG. 7 is a diagram illustrating an example of an operation in which an electronic device (e.g., the electronic device 101 of FIG. 2) segments and transmits data to another electronic device (e.g., the electronic device 102 of FIG. 2) via a UWB ranging round.

According to various embodiments of the present disclosure, in operation 701, the first electronic device 101 may transmit an RCM so as to control ranging, and may perform ranging by performing transmission of a poll frame, reception of a reply frame, transmission of a final frame, and reception of a ranging result report frame based at least on various types of control information included in the RCM. For example, operation 701 may correspond to operations 301 to 311 of FIG. 3. The operations may be similar to the description which has been provided with reference to FIG. 3 and thus, the detailed description thereof will be omitted.

According to an embodiment of the present disclosure, after ranging is successfully performed, the first electronic device 101 may transmit data in a separate frame, based on control information of the RCM, for example, element #6 of the ranging management list as shown in Table 1, in operation 703.

According to an embodiment of the present disclosure, based on the distance between devices according to a ranging result and/or various transmission conditions, the first electronic device 101 may segment and transmit data via a plurality of frames depending on the size of the data. Based on the size of the data, the distance between the devices, and/or transmission conditions according to an embodiment, an operation of determining whether to segment data and setting a data length used as a criterion for segmentation will be described in detail with reference to FIG. 8. For example, the first electronic device 101 may receive a reception sensitivity associated with frames that the second electronic device 102 receives in the current ranging round, together with a ranging result report received from the second electronic device 102 as the ranging operation is performed, and may use the same as the above-described transmission conditions.

According to an embodiment of the present disclosure, the first electronic device 101 may set, to 1, the value of a predetermined bit (e.g., segmented frame bit) of a message control field in the structure of a data transmission frame shown in Table 4, and may indicate that data to be transmitted is a segmentation frame. Based thereon, the second electronic device 102 may recognize that the data received in operation 703 is a segmentation frame that is a part of the entire data, may recognize that an additional segmentation frame is to be transmitted, and may perform an operation of awaiting reception of an additional segmentation frame after transmitting an acknowledgement message in operation 705 in association with data reception in operation 703.

According to an embodiment of the present disclosure, if receiving an acknowledgement message in operation 705 after transmitting a first segmentation frame in operation 703, the first electronic device 101 may transmit data of a second segmentation frame in operation 707, and may receive an acknowledgement message in response thereto in operation 709.

According to an embodiment of the present disclosure, as shown in Table 1, a ranging device management list may define a slot for transmitting a data frame and a slot for transmitting an acknowledgement frame in response thereto. Accordingly, additional control information of an RCM including the ranging device management list may be minimized. If data segmentation is needed, the fact that corresponding data is a segmentation frame needs to be indicated in a data transmission frame. For example, by setting a segmentation frame bit in the message control field value to a designated value (e.g., b1), it is indicated that segmentation data is to be transmitted in an additional slot.

According to an embodiment of the present disclosure, in the case of transmitting data upon completion of ranging, the first electronic device 101 may determine how many segments is data to be segmented into for transmission based on the length of the data. Therefore, upon completion of ranging, the number of data frame segmentations and the number of slots for data frame transmission based thereon may be dynamically controlled within the length of the corresponding ranging round. In this instance, a device that receives the data, for example, the second electronic device 102 may identify whether the corresponding data is a segmentation frame based on the value of the message control field of a data frame transmitted, and if the data is identified as a segmentation frame, may activate a reception channel in a subsequent frame immediately after receiving the data in the case of not transmitting an acknowledgement frame, or may activate a reception channel in a subsequent slot after transmitting an acknowledgement frame in the case of transmitting an acknowledgement frame.

According to an embodiment of the present disclosure, after transmitting an acknowledgement message in operation 705 upon reception of the data of the first segmentation frame in operation 703, the second electronic device 102 may identify whether a corresponding frame in association with the data of the second segmentation frame in operation 707 is a last segmentation frame based on the value of the message control field of the corresponding frame. For example, if a segmentation frame bit value of the message control field is not set, it is identified that the corresponding frame is the last frame. The second electronic device may not await reception after transmitting an acknowledgement message in operation 709, and may terminate a ranging round.

According to an embodiment of the present disclosure, if the first electronic device 101 performs communication with the second electronic device 102 via short-range wireless communication (e.g., Bluetooth), or may perform a ranging operation with the second electronic device 102 in a UWB ranging round, the first electronic device 101 may identify whether data to be transmitted to the second electronic device 102 is present. For example, if data to be transmitted to the second electronic device 102 is generated, the first electronic device 101 may inform that there is data to be transmitted to the second electronic device 102 via a ranging control message (RCM).

According to an embodiment of the present disclosure, when an electronic device (e.g., the first electronic device 101 of FIG. 2) transmits data to another electronic device (e.g., the second electronic device 102 of FIG. 2) via a UWB ranging round, the electronic device may determine whether to perform transmission via a single frame or via a plurality of frames based on segmentation. In the case of transmission via a plurality of frames based on segmentation, the size of a segment (e.g., bytes) of frame data may be determined.

According to various embodiments of the present disclosure, in the case of transmitting data in operation 703, the first electronic device 101 may segment data using an optimal value which enables successful transmission, based on the current distance to the second electronic device 102 and a communication condition or state based on a completed ranging result. For example, the communication condition may include conditions such as the reception sensitivity of a signal of the first electronic device 101 and/or the maximum transmission power, or an average power of a transmitted signal.

Equation 1 below is to determine the length of data based on Friis formula.

$$PR \text{ [dBm]} = PT \text{ [dBm]} + G \text{ [dB]} - L \text{ [dB]} - 20 \log 10(4\pi fcd/c) + \alpha \qquad \text{[Equation 1]}$$

Where the values of elements included in Equation 1 are as follows:

PR=the reception sensitivity of a signal;

PT=the average power of a transmitted signal (average power);

G=the gain of a transmission or reception antenna;

L=a loss in a device system such as a PCB, a cable, a connector or the like;

fc=central frequency;

d=the distance between two devices;

c=the speed of light;

α=an adaptive TX power gain.

In Equation 1 described above, the values remaining after excluding PR, d, and a that are determined based on ranging between two devices correspond to constants. Here, PR and d may be identified when ranging is normally completed, and a may be determined when frame transmission is performed.

Generally, a UWB has an average transmission power limitation of −41.3 dBm/MHz and the maximum transmission power limitation of 0 dBm/50 MHz.

According to various embodiments of the present disclosure, using an adaptive TX power scheme, a frame may be transmitted by determining the peak voltage of each pulse at the point in time at which data to be transmitted is determined.

According to an embodiment of the present disclosure, a reception sensitivity (RX sensitivity) that may be regarded as a threshold value for signal reception may differ depending on hardware of a UWB device (e.g., a UWB chip). In addition, the RX sensitivity may differ depending on a communication parameter such as a data rate, or RX sensitivity values depending on each communication parameters may be determined in advance. Therefore, if the RX sensitivity of a UWB chip is −95 dBm in a parameter configuration used for the current ranging, a signal having a strength less than or equal to the RX sensitivity may not be received. Therefore, using the RX sensitivity value of the UWB chip and a PR value measured in the current ranging, a link margin available for performing communication may be calculated.

For example, if the RX sensitivity value of the UWB chip is −95 dBm and a PR value calculated according to ranging is −90 dB, it is identified that there is a link margin of 5 dB. Therefore, communication may be performed by setting a to a value corresponding to the margin in Equation 1. For example, if a is decreased, the peak voltage of a reception pulse may be decreased. Accordingly, the length of a frame of data may be lengthen and a larger amount of data may be transmitted for each time.

Figure 8:
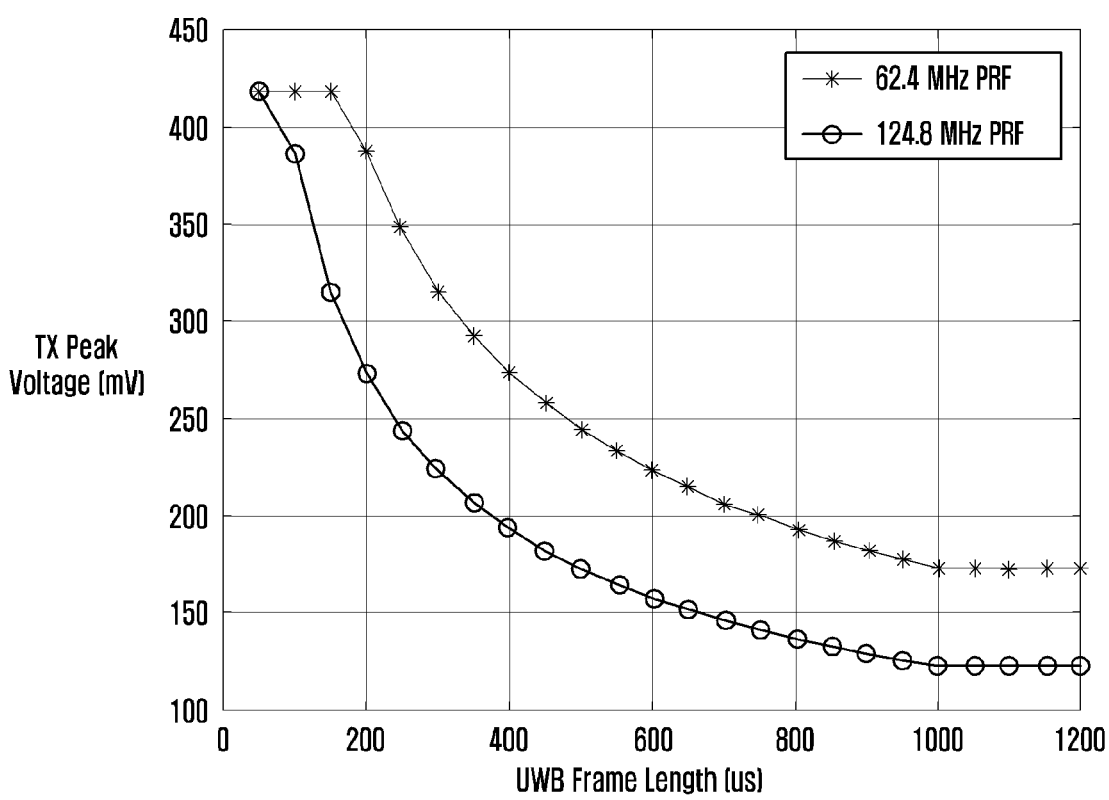
FIG. 8 is a diagram illustrating a change in transmission power when an electronic device segments data for transmission, according to various embodiments of the present disclosure.

FIG. 8 is a diagram illustrating a change of transmission power when an electronic device (e.g., the first electronic device 101 of FIG. 2), according to various embodiments of the present disclosure, segments data for transmission to another electronic device (e.g., the second electronic device 102 of FIG. 2).

The graph of FIG. 8 illustrates an example of the maximum transmission peak voltage (TX peak voltage) per frame length available within the scope of UWB regulations. The shapes of graphs are similar due to the regulations. However, conditions such as an antenna gain and/or a path loss may differ depending on a device and thus, the maximum value and/or the minimum value of a peak voltage may differ.

According to various embodiments of the present disclosure, the maximum transmission peak voltage value per frame length may be measured via an antenna test according to the specifications of a device, and may be stored in a memory.

For example, in the case of a base pulse repetition frequency (BPRF) (e.g., 62.4 MHz), if a transmission peak voltage (TX peak voltage) capable of transmitting a frame having a length of 200 us is decreased by half, a device having a condition of the maximum transmission peak voltage per frame length as shown in the example of FIG. 8 may transmit a frame having a length of approximately 800 us.

According to various embodiments of the present disclosure, a frame length may differ depending on a set value such as a SYNC, a start-of-frame delimiter (SFD), a scrambled timestamp sequence (STS), a PHR, and a PSDU that are included in a frame. For example, if preamble symbol repetitions (PSR) 64, SFD 8, and STS 1 segment are used, and a PSDU data rate is 6.8 Mb/s, data transmission of approximately 33 bytes may be allowed via 200 us and data transmission of approximately 544 bytes may be allowed via 800 us.

Referring to Equation 1, in the example in which, according to a ranging operation, the distance to the second electronic device 102 is 50 m and a reception signal strength PR value is measured as −92 dBm, if the first electronic device 101 desires to transmit data of 1000 bytes, a marge is 3 dB when the RX sensitivity is −95 dBm, and thus, a transmission peak voltage may be decreased by 1.5 dB.

In the same configuration as the above-described example, when data of 60 bytes is desired to be transmitted, a frame length may be approximately 230 us, and a transmission peak voltage may be approximately 360 mV. Here, if the voltage is decreased by a margin of 1.5 dB, pulse transmission may be performed at approximately 255 mV and a frame length may be approximately 455 us. Therefore, the data of approximately 250 bytes may be transmitted at once, and if it is desired to transmit data of 1000 bytes, transmission may be performed by segmenting the data into four frames. If the data is segmented to be greater than the above, a link margin may be insufficient, and thus communication may fail. If the data is segmented to be shorter than the above, 5 or more frames, as opposed to 4 frames, may be used for transmission and thus, overhead may occur. Therefore, a data length that is capable of being transmitted for each time is set to a maximum of 250 byte, a successful transmission rate may be increased and overhead may be minimized.

In the example of the graph of FIG. 8, the difference between the maximum peak voltage and the minimum peak voltage is approximately 3.8 dB in the case of BPRF, and is approximately 5.4 dB in the case of HPRF. Therefore, if a link margin is greater than or equal to the above, a data length which is capable of being transmitted in an actual frame may be a maximum of 127 bytes in the case of BPRF, and may be a maximum of 4095 bytes in the case of HPRF.

As described above, the first electronic device 101 may determine whether segmentation of data desired to be transmitted is needed for transmission based on information obtained based on a ranging result and/or various communication conditions, and may determine the maximum length of segmentation frame data when segmentation is performed.

According to various embodiments of the present disclosure, an electronic device (e.g., the electronic device 101 of FIG. 1) may include a wireless communication circuit (e.g., the wireless communication module 192 of FIG. 1), a memory (e.g., the memory 130 of FIG. 1), and a processor (e.g., the processor 120 of FIG. 1) operatively connected to the memory and the wireless communication circuit, and the memory stores instructions that when executed cause the processor to start a ranging round by transmitting, to an external electronic device, an RCM including transmission control information of data to be transmitted, to perform ranging based on the ranging control message, and upon completion of ranging, to transmit, based on the transmission control information included in the ranging control message, the data in a slot allocated in the ranging round.

According to various embodiments of the present disclosure, the transmission control information may be included as an additional element of a ranging device management list included in the ranging control message.

According to various embodiments of the present disclosure, the transmission control information may include information for controlling whether to perform retransmission if the data transmission fails.

According to various embodiments of the present disclosure, the information for controlling whether to perform retransmission may be included in a time critical message field of the additional element.

According to various embodiments of the present disclosure, if the data transmission fails, the processor may be configured to retransmit, based on the information for controlling whether to perform retransmission, the data in an additional slot allocated in the ranging round.

According to various embodiments of the present disclosure, if the data transmission fails, the processor may be configured to retransmit, based on the information for controlling whether to perform retransmission, the data a predetermined number of times before the ranging round ends.

According to various embodiments of the present disclosure, the processor may be configured to include the data in a data field of a data frame and to transmit in the allocated slot.

According to various embodiments of the present disclosure, the data frame may include a field indicating information that indicates whether to segment the data.

According to various embodiments of the present disclosure, the processor may be configured to include a segment of the data in the data frame that includes the information indicating whether to segment the data, and to transmit to the external electronic device via the allocated slot, and to transmit a data frame including another segment of the data in a next slot subsequently allocated.

According to various embodiments of the present disclosure, the processor may be configured to determine whether to segment the data based on a distance to the external electronic device obtained upon completion of ranging, a reception sensitivity, and a maximum transmission power limitation, and to determine a length of a segment of the data segmented based thereon.

The embodiments of the disclosure are provided merely for ease of description and understanding of the content of the technology, but does not intent to limit the scope of the technology disclosed herein. Therefore, the scope of the technology disclosed herein should be construed to include all changes or modifications derived based on the technical idea of the various embodiments of the disclosure, in addition to the embodiments provided herein.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a wireless communication circuit;
memory storing instructions; and
a processor operatively connected to the memory and the wireless communication circuit,
wherein the instructions, when executed by the processor, cause the electronic device to:
transmit, via the wireless communication circuit to an external electronic device, a ranging control message (RCM) including transmission control information of data to be transmitted, wherein a ranging round starts with transmission of the RCM,
perform ranging with the external electronic device based on the RCM, and
transmit, via the wireless communication circuit, the data in a slot allocated in the ranging round based on the transmission control information included in the RCM, when a distance measurement to the external electronic device is completed through the ranging.

2. The electronic device of claim 1, wherein the transmission control information comprises information for determining whether to perform retransmission if a transmission of the data fails.

3. The electronic device of claim 2, wherein, if the transmission of the data fails, the instructions, when executed by the processor, cause the electronic device to:
retransmit, based on the information for determining whether to perform retransmission, the data in an additional slot allocated in the ranging round.

4. The electronic device of claim 1, wherein the instructions, when executed by the processor, cause the electronic device to:
include the data in a data field of a data frame; and
transmit, via the wireless communication circuit, the data in the allocated slot.

5. The electronic device of claim 4, wherein the data frame comprises a field indicating information that determines whether to segment the data.

6. The electronic device of claim 5, wherein the instructions, when executed by the processor, cause the electronic device to:
include a segment of the data in the data frame that includes the information determining whether to segment the data;
transmit, via the wireless communication circuit, the segment of data to the external electronic device in the allocated slot; and
transmit, via the wireless communication circuit, a data frame including another segment of the data in a next slot that is subsequently allocated.

7. The electronic device of claim 5, wherein the instructions, when executed by the processor, cause the electronic device to:
determine a length of the segment of the data based on a distance to the external electronic device obtained by performing the ranging, a reception sensitivity, a maximum transmission power limitation and a length of the data.

8. The electronic device of claim 1, wherein the instructions, when executed by the processor, cause the electronic device to:
not transmit, via the wireless communication circuit, the data in the slot allocated when the distance measurement to the external electronic device through the ranging fails.

9. The electronic device of claim 1, wherein the instructions, when executed by the processor, cause the electronic device to:
transmit, via the wireless communication circuit, the data in the slot allocated in the ranging round based on the transmission control information included in the RCM, when a ranging result report including a distance value obtained by the external electronic device is received from the external electronic device.

10. The electronic device of claim 1, wherein the data includes at least one of information related to a change of a parameter after ranging begins, authentication information for an access service, or control information associated with execution of a predetermined event.

11. A method of an electronic device, the method comprising:
transmitting, to an external electronic device, a ranging control message (RCM) including transmission control information of data to be transmitted, wherein a ranging round starts with transmission of the RCM;
performing ranging with the external electronic device based on the RCM; and
transmitting, based on the transmission control information included in the RCM, the data in a slot allocated in the ranging round when a distance measurement to the external electronic device is completed through the ranging.

12. The method of claim 11, wherein the transmission control information comprises information for determining whether to perform retransmission when a data transmission fails.

13. The method of claim 12, further comprising:
when the data transmission fails, retransmitting, based on the information for determining whether to perform retransmission, the data in an additional slot allocated in the ranging round.

14. The method of claim 12, further comprising:
when the data transmission fails, retransmitting, based on the information for determining whether to perform retransmission, the data within a predetermined number of times before the ranging round ends.

15. The method of claim 11, further comprising:
including the data in a data field of a data frame; and
transmitting the data in the allocated slot.

16. The method of claim 15, wherein the data frame comprises a field indicating information that determines whether to segment the data.

17. The method of claim 16, further comprising:
including a segment of the data in the data frame including the information determining whether to segment the data;
transmitting the segment of data to the external electronic device in the allocated slot; and
transmitting a data frame including another segment of the data in a next slot that is subsequently allocated.

18. The method of claim 16, further comprising:
determining a length of the segment of the data based on a distance to the external electronic device obtained by performing the ranging, a reception sensitivity, a maximum transmission power limitation and a length of the data.

19. The method of claim 11, further comprising:

not transmitting the data in the slot allocated when the distance measurement to the external electronic device through the ranging fails.

20. The method of claim 11, wherein the transmitting the data comprises:

transmitting, based on the transmission control information included in the RCM, the data in the slot allocated in the ranging round when a ranging result report including a distance value obtained by the external electronic device is received from the external electronic device.

* * * * *